United States Patent [19]

Iwabuchi et al.

[11] Patent Number: 4,672,219

[45] Date of Patent: Jun. 9, 1987

[54] IMAGE READER WITH SCANNING BY ARRAY OF SEQUENTIALLY ILLUMINATED LIGHT SOURCES

[75] Inventors: Toshiyuki Iwabuchi; Shunji Sakai; Akira Uchiyama; Masaaki Sakamoto; Yuichi Masaki, all of Tokyo, Japan

[73] Assignee: Oki Electric Industry Co., Ltd., Tokyo, Japan

[21] Appl. No.: 748,423

[22] Filed: Jun. 25, 1985

[30] Foreign Application Priority Data

Jun. 28, 1984 [JP] Japan .............................. 59-95999[U]
Nov. 20, 1984 [JP] Japan ........................... 59-175113[U]

[51] Int. Cl.$^4$ ............................................ H01J 40/14
[52] U.S. Cl. ................................ 250/578; 358/213.11; 358/293
[58] Field of Search ................ 250/211 R, 211 J, 578; 358/212, 213, 293

[56] References Cited

U.S. PATENT DOCUMENTS

| | | | |
|---|---|---|---|
| 4,189,753 | 2/1980 | Parsons et al. | 358/293 |
| 4,317,137 | 2/1982 | Tompkins | 358/293 |
| 4,446,364 | 5/1984 | Hayashi et al. | 250/578 |
| 4,471,384 | 9/1984 | Sato et al. | 358/293 |
| 4,482,804 | 11/1984 | Oritsuki et al. | 358/293 |
| 4,553,036 | 11/1985 | Kawamura et al. | 250/578 |

OTHER PUBLICATIONS

International Electron Devices Meeting, 1981 Digest, Section 13.5, by Komiya et al, pp. 309-311.
International Electron Devices Meeting, 1982 Technical Digest, Section 12.7, by Kaneko et al., pp. 328-331.
International Electron Devices Meeting, 1981 Digest, Section 13.6, by Kanoh et al., pp. 312-316.

Primary Examiner—David C. Nelms
Attorney, Agent, or Firm—Wenderoth, Lind & Ponack

[57] ABSTRACT

An image reader is adapted to read an image represented on a document. The image reader comprises a reading unit, an LEDs driving circuit, and means for moving the reading unit and the document relatively. The above reading unit comprises an LEDs array arranged in a straight line as light sources, a rod lens array for guiding the light emitted from each LED of the LEDs array and focusing the light on the document, and a pair of photosensors being disposed in parallel and connected in parallel with respect to each other for converting a reflected light from the document to a photocurrent. And each LED of the LEDs array is turned on only one at a time sequentially by means of the LEDs driving circuit, then the reading of the document is effected by means of the photosensors.

4 Claims, 13 Drawing Figures

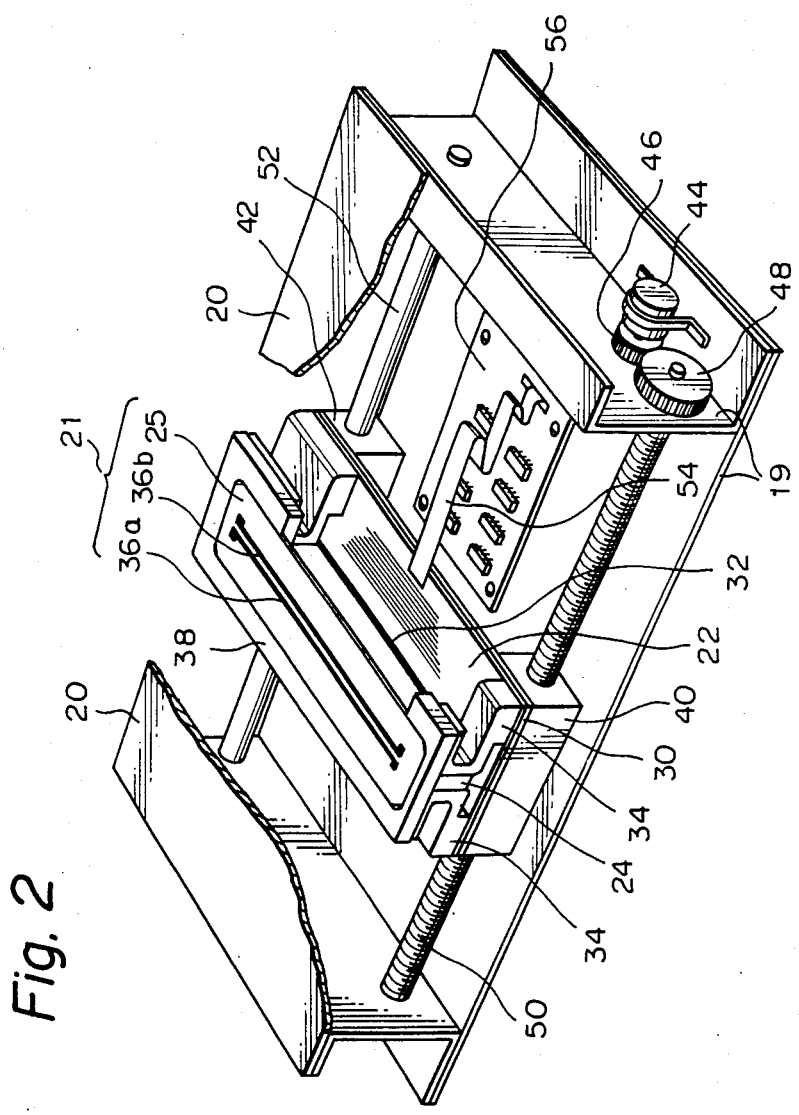

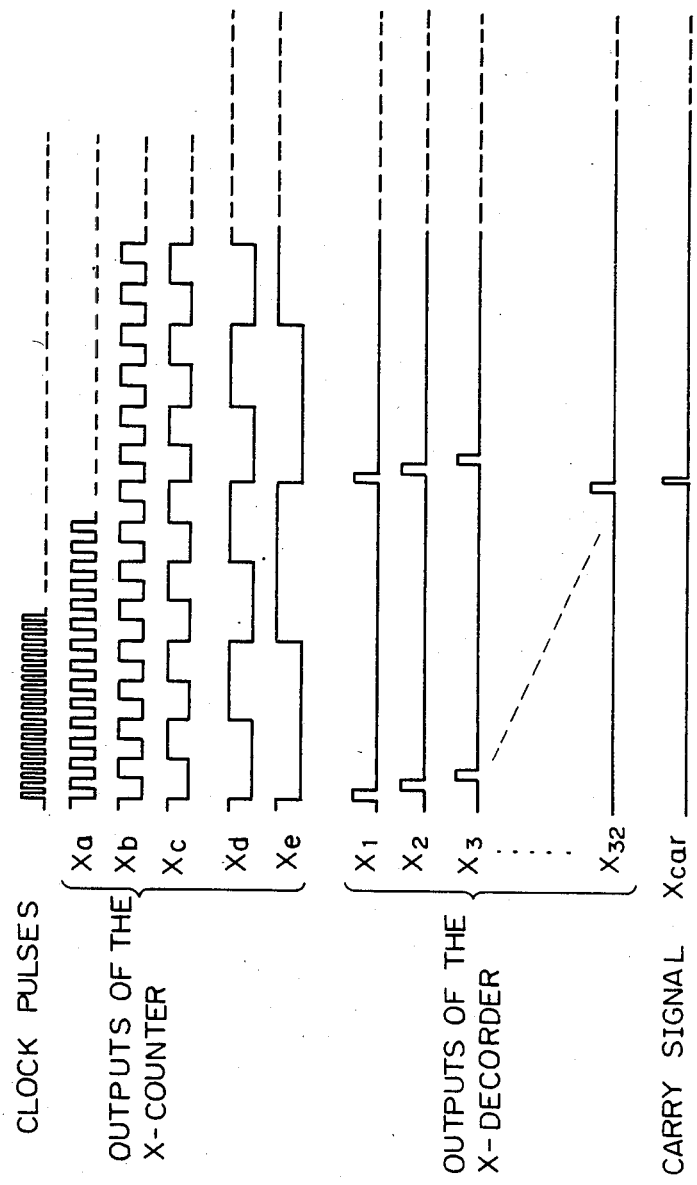

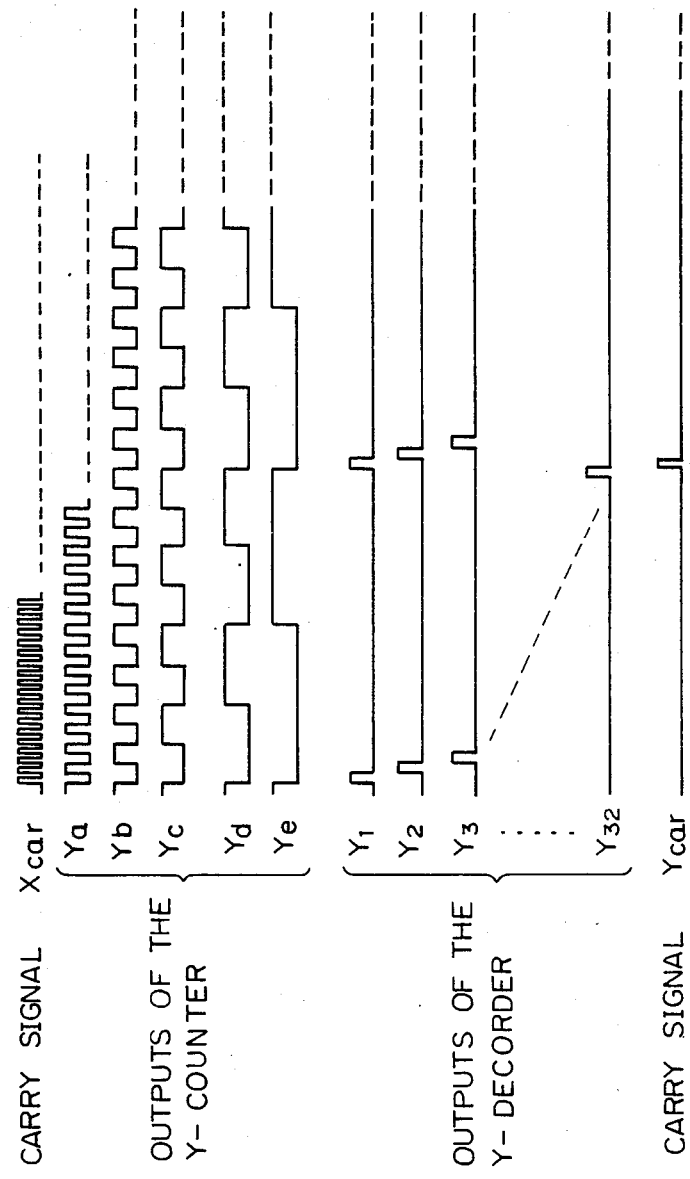

IMAGE READER WITH SCANNING BY ARRAY OF SEQUENTIALLY ILLUMINATED LIGHT SOURCES

BACKGROUND OF THE INVENTION

This invention relates to improvements in an image reader as an image input apparatus for a facsimile system and the like.

A conventional image reader comprises an array of light-emitting diodes (hereinafter referred to as "LEDs") arranged in a straight line to form a light source, a rod lens array for guiding a reflectied light from a document, an array of photosensing elements arranged in a straight line for receiving the reflected light from the document to generate a photocurrent, and a signal detection circuit connected to the photosensing element.

When the image reader reads the document, all LEDs of the LED array are turned on at the same time so as to illuminate the document. The rod lens array guides the reflected light to each photosensing element. Each photosensing element is responsive to the reflected light to generate a photocurrent. The signal detection circuit detects a signal by means of the photocurrent when it is in a charge storage mode. Therefore, the signal detection circuit needs to provide the same numbers of switches as the numbers of the photosensing elements, so that the circuit structure is complicated. Moreover, a power consumption of the image reader is very large because all the LEDs are turned on at the same time during reading.

SUMMARY OF THE INVENTION

An object of the present invention is to provide a novel image reader which is small sized, light weight, and low power consumption.

An image reader according to this invention comprises a reading unit, an LED driving circuit, and means for moving either one of the reading unit and a document relative to the other.

The reading unit comprises an array of light emitting diodes (LEDs) arranged in a single straight line to form light sources and having the length at least as long as the width of the document, a rod lens array being placed opposite to the LED array for guiding the light emitted from each LED and focusing the light on the document, and a pair of photosensors being disposed in parallel and connected in parallel with each other for converting a reflected light from the document to a photocurrent. Each of photosensors is composed of one element and has the length at least as long as the length of the document. The LEDs driving circuit drives each LED of the LED array to turn on only one at a time sequentially.

The photosensors generate a photocurrent by receiving the reflected light from the document, and the reading of the document is thereby achieved.

For a better understanding of this invention, reference is made to the following detailed description of the invention given in connection with the accompanying drawings. In the drawings:

BRIEF DESCRIPTION OF THE DRAWINGS

FIG. 2 is a partial cutaway view of a first embodiment according to the invention.

FIG. 6(a) and FIG. 6(b) are timing diagrams for the circuit of FIG. 5.

a photosensor

Figure 9:
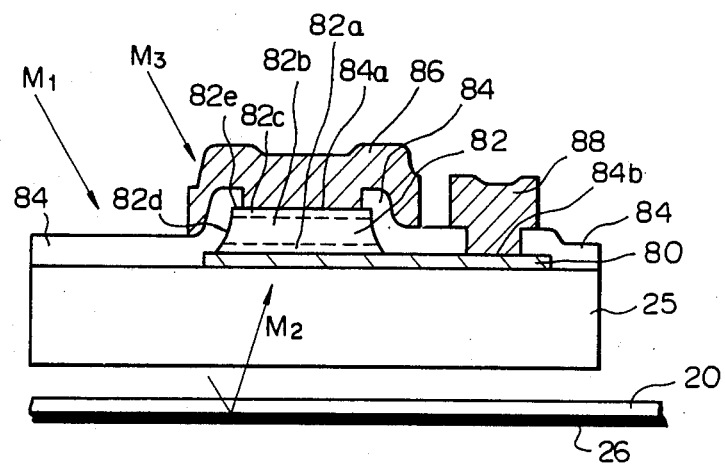

FIG. 9 is a sectional side elevation view of a photosensor of the image reader of the invention.

Figure 10:
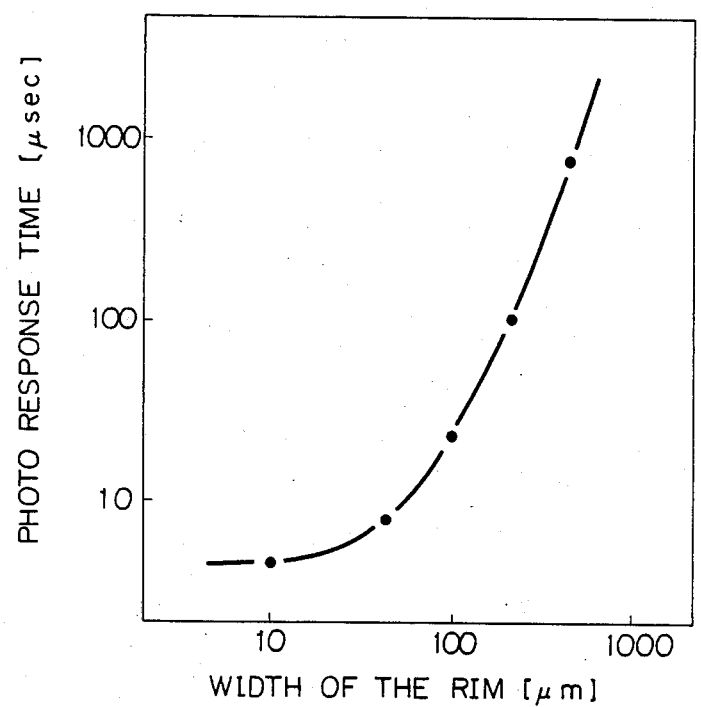

FIG. 10 is a graph showing characteristics of light response time relative to the width of a rim of a photosensor's surface which does not contact a metal electrode.

Figure 11:
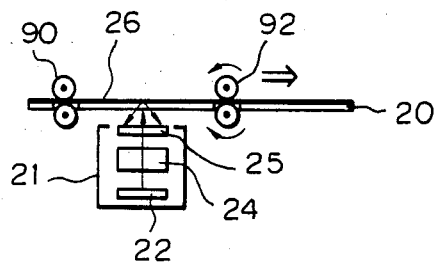

FIG. 11 is a sectional view of the main part of a second embodiment according to the invention.

DETAILED DESCRIPTION OF PREFERRED EMBODIMENTS

Figure 1:
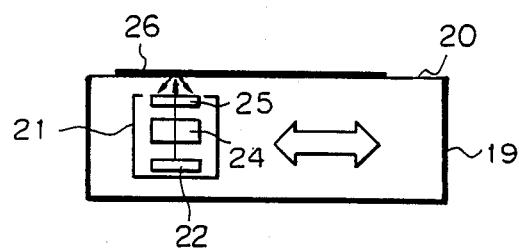
FIG. 1 is a sectional view of the main part of a first embodiment according to the invention.

Referring now to FIG. 1, there is shown a main part of first embodiment of a image reader according to the invention. The image reader comprises housing 19, transparent plate 20 for supporting a document 26, and a reading unit which is movable along the transparent plate 20. The reading unit 21 comprises a plate 22 having an LED array, an array of rod lenses 24 being placed opposite to the LED array, and a transparent sensor plate 25 having a pair of linear photosensors. The reading unit 21 moves from one inner end to the other inner end of the housing for reading the document 26.

FIG. 2 is a partial cutaway view of the first embodiment. In FIG. 2, the first embodiment is illustrated in detail.

In FIG. 2, the reading unit 21 comprises the plate 22, a unit base 30 for supporting the plate 22, an LED array 32 arranged in a straight line on the plate 22 to form light sources and having the length at least as long as the width of the document 26, the rod lens array 24 being placed opposite to the LED array 32 for guiding the light emitted from each LED and focusing the light on the document 26, rod lens holders 34 for supporting the rod lens array 24, the sensor plate 25, a pair of photosensors 36a and 36b being disposed in parallel with each other and connected in parallel with each other for converting a reflected light from the document 26 to a photocurrent, each of the photosensors being composed of one photosensing element such as an amorphous silicon p-i-n type photodiode and having the length at least as long as the length of the document, a sensor holder 38 for supporting the sensor plate 25, a nut block 40 attached to one side of under surface of the unit base 30, and a sleeve block 42 attached to the other side of under surface of the unit base 30.

Further, in FIG. 2, reference numeral 19 denotes the housing, 20 the transparent plate for supporting the document 26 shown in partial cutaway view, 44 a motor for moving the reading unit 21, 46 a first gear attached to the shaft of the motor 44, 48 a second gear engaged with the first gear 46, 50 a gear shaft attached to the housing rotatably and engaging with the screw hole of the nut block 40, one end of the gear shaft 50 being attached to the gear 48, 52 a guide shaft attached to the housing 19 fixedly through the hole of the sleeve block 42, 54 a flexible cable for wiring, 56 a circuit board having a driving circuit for the LED array 32 and the motor 44 and a reading circuit for the photosensors 36a and 36b.

The operation of the first embodiment will now be described. The reading unit 21 is moved along the gear shaft 50 and the guide shaft 52 by rotating the gear shaft 50 by means of the motor 44 each time one line of the document 26 is read. The reading operation of the reading unit 21 will be described by using FIG. 3 and FIG. 4.

Figure 3:
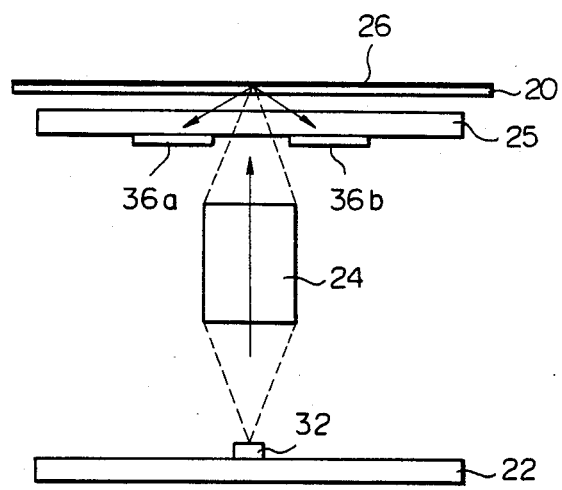
FIG. 3 is a sectional side elevation view of the main part of a reading unit of the image reader according to the invention.
Figure 4:
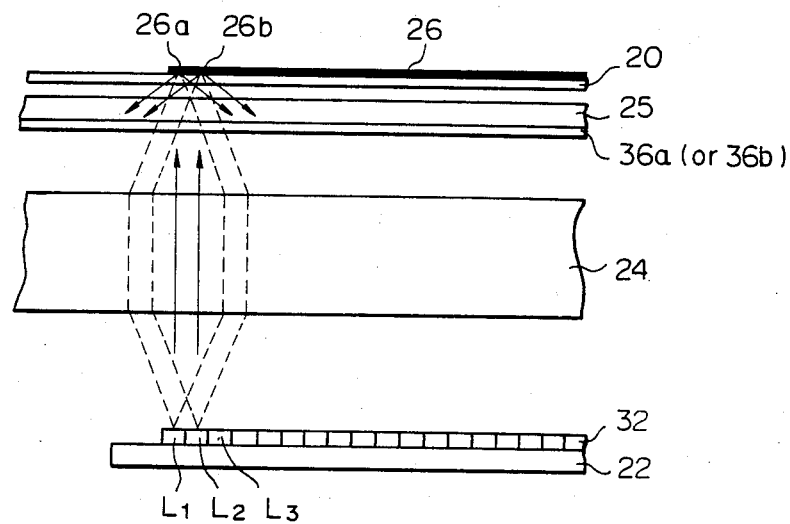
FIG. 4 is a partial longitudinal sectional view of the main part of the reading unit of the image reader according to the invention.

FIG. 3 shows a sectional side view of the main part of the reading unit 21, and FIG. 4 shows a partial longitudinal sectional view of the main part of the reading unit 21.

The LED array 32 is composed of 32 LED chips each of which has 32 LEDs. 32 LED chips are mounted on the center portion of the plate 22 so as to align 1024 LEDs in a straight line. The LED array has the length at least as long as the width of the document 26. The distance between the LED array 32 and the document 26 is about 15-20 mm. The rod lens array 24 is placed opposite to the LEDs array and has the length corresponding to the length of the LED array 32. The rod lens array 24 guides the light emitted from each LED and focuses the light on the document 26. The photosensors 36a and 36b are formed on the transparent sensor plate 25 and arranged synmetrically with respect to each other at both sides of the path of the light emitted from the LED.

When the first LED $L_1$ is turned on, then the light is focused on a reading spot 26a on the document 26 via the rod lens array 24, the sensor plate 25, and the plate 20. The reflected light from the document 26 illuminates the photosensors 36a and 36b via the plate 20 and the sensor plate 25. The luminous intensity of the reflected light corresponds to the darkness of the reading spot 26a of the document 26. Each of the photosensors 36a and 36b is responsive to the luminous intensity of the reflected light to generate the photocurrent. Thus, the darkness of the reading spot 26a is read as an output of the photosensors 36a and 36b. The LED $L_1$ is turned off after predetermined time such as 60 us, and then second LED $L_2$ is turned on to read next reading spot 26b. Thus, each LED ($L_1$, $L_2$, $L_3$, $L_4$, ..., $L_{1024}$) is turned on and off one by one in order to read one line of the image represented on the document 26. The result of reading to each reading spot is outputted one by one in order as the photocurrent from the photosensors 36a and 36b.

Figure 5:
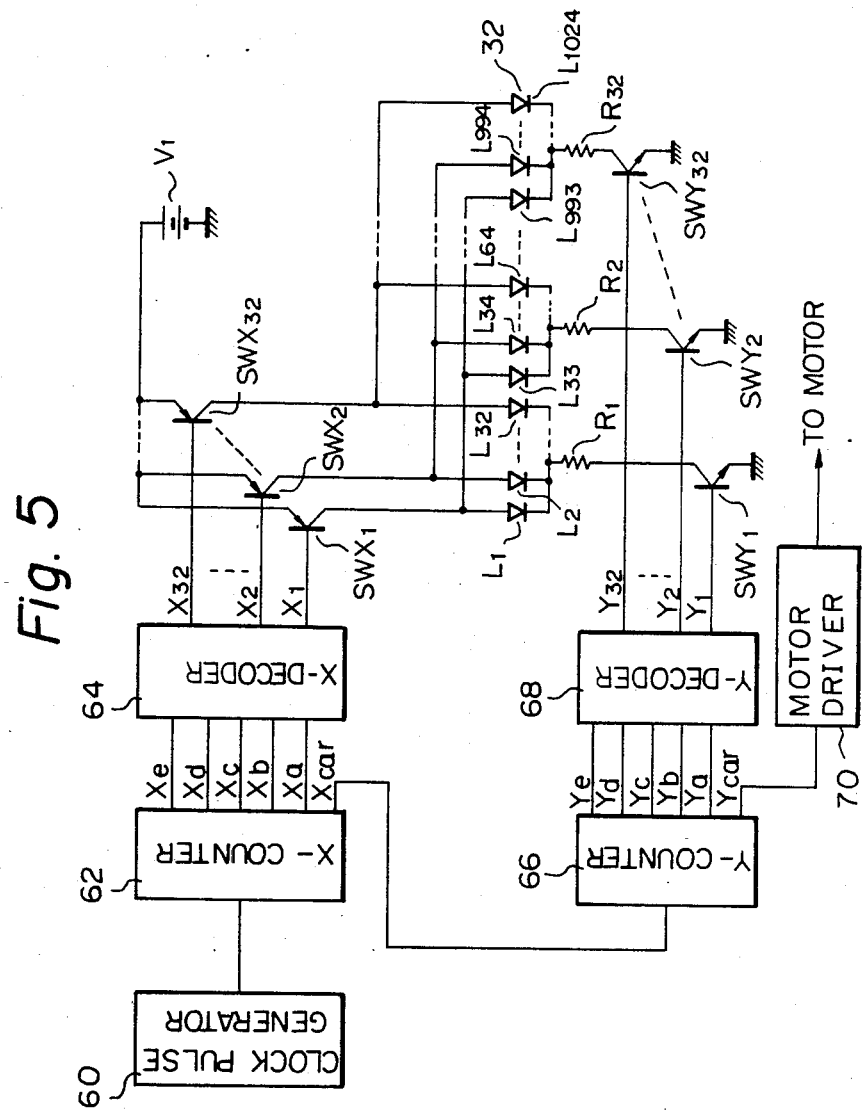
FIG. 5 is a schematic block diagram of a driving circuit for a LEDs array and a motor of the image reader according to the invention.

FIG. 5 shows a block diagram of the driving circuit for the LED array 32 and the motor 44. FIG. 6(a) and FIG. 6(b) show a timing diagram of the operation of the circuit of FIG. 5.

The LED array 32 is composed of 32 groups each of which comprises 32 LEDs. Each group corresponds to the above described LED chip. The cathodes of all LEDs in a group are connected to each other commonly, and are connected to one terminal of a corresponding resistor ($R_1$, $R_2$, ..., $R_{32}$) for correcting the quantity of light. Another terminal of each resistor ($R_1$, $R_2$, $R_{32}$ is connected to one terminal of a corresponding Y-switch ($SWY_1$, $SWY_2$, ..., $SWY_{32}$) made of transistor. another terminals of the Y-switches are connected to the ground. The anodes of LEDs of same respective order in each group are also connected to each other commonly, and are connected to one terminal of a corresponding X-switch ($SWX_1$, $SWX_2$, ..., $SWX_{32}$) made of transistor. Another terminals of the X-switches are connected to a power source $V_1$. The above Y-switches are composed of 32 Y-switches ($SWY_1$, $SWY_2$, ..., $SWY_{32}$), and the above X-switches are composed of 32 X-switches ($SWX_1$, $SWX_2$, ..., $SWX_{32}$). Thus, the LED array 32 is connected to the power soure $V_1$ and the ground in matrix wiring via the X-switches, the Y-switches, and the resistors. A certain LED enables to turn on by selectively turning on one of the Y-switches ($SWY_1$, $SWY_2$, ..., and $SWY_{32}$) and one of the X-switches ($SWX_1$, $SWX_2$, ..., and $SWX_{32}$).

A clock pulse generator 60 issues clock pulses to a X-counter 62. The X-counter 62 is responsive to the clock pulses to issue outputs $X_a$, $X_b$, $X_c$, $X_d$, and $X_e$ A X-decoder 64 is responsive to these outputs $X_a$, $X_b$, $X_c$, $X_d$, and $X_e$ to issue outputs $X_1$, $X_2$, $X_3$, ..., $X_{31}$, and $X_{32}$. The X-switches $SWX_1$, $SWX_2$, $SWX_3$, ..., $SWX_{32}$ are resposive to these outputs $X_1$, $X_2$, ..., $X_{31}$, and $X_{32}$ to be turned on only one at a time sequentially. When all outputs $X_a$, $X_b$, $X_c$, $X_d$, and $X_e$ of the X-counter 62 become "1", the X-counter 62 issues a carry signal $X_{car}$ to a Y-counter 66. The Y-counter 66 is responsive to the carry signal $X_{car}$ to issue outputs $Y_a$, $Y_b$, $Y_c$, $Y_d$, and $Y_e$. A Y-decoder 68 is responsive to the outputs $Y_a$, $Y_b$, $Y_c$, $Y_d$, and $Y_e$ to issue outputs $Y_1$, $Y_2$, $Y_3$, ..., $Y_{31}$, and $Y_{32}$. The Y-switches $SWY_1$, $SWY_2$, ..., $SWY_{31}$, and $SWY_{32}$ are responsive to the these outputs $Y_1$, $Y_2$, $Y_3$, ..., $Y_{31}$, and $Y_{32}$ to be turned only one at a time sequentially. When the clock pulse generator issues first pulse, the X-switch $SWX_1$ and the Y-switch $SWY_1$ are turned on, and then the LED $L_1$ is turned on. Thus, each LED is turned on and off by selectively switching of the X-switches and the Y-switches. After the final $LED_{1024}$ is turned on and off, the Y-counter 66 issues a carry signal $Y_{car}$ to a motor driver 70. The motor driver 70 drives the motor 44 by receiving the carry signal $Y_{car}$. As a result, the reading unit is moved to read the next line of the document 26.

Figure 7:
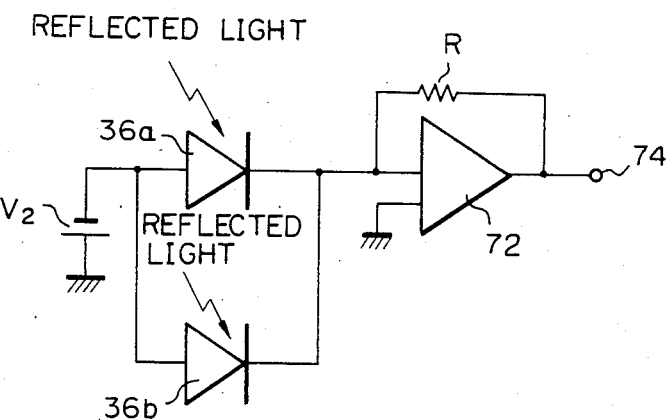
FIG. 7 is a schematic block diagram of a reading circuit for photosensors of the image reader according to the invention.

FIG. 7 shows a block diagram of the reading circuit of the photosensors 36a and 36b. As shown in FIG. 7, the photosensors 36a and 36b are connected in parrallel with each other. The anodes of the photosensors 36a and 36b are connected to a negative power source $V_2$, and the cathodes of the photosensors 36a and 36b are connected to a amplifier 72.

The photocurrent generated respectively in the photosensors 36a and 36b is superposed, and amplified by the amplifier 72. The amplified photocurrent is issued as a signal current S from a output terminal 74. It is not necessary to provide switches for the reading circuit of the photosensors 36a and 36b of the invention, because the reading circuit operates in real time mode, not in charge storage mode.

Figure 8A:
FIG. 8(a) is a example view of an image as a reading object.
Figure 8B:
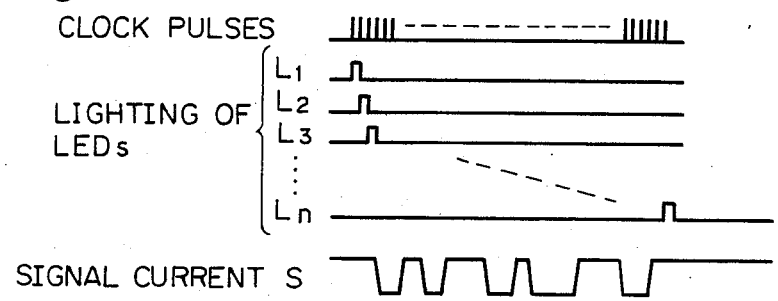
FIG. 8(b) is a timing diagram in case of reading the image of FIG. 8(a).

Now, FIG. 8(a) shows an example view representing an image as the reading object. In FIG. 8(a), a line 76 is a scanning line to be read. FIG. 8(b) shows a timing diagram indicating the relation among the clock pulses, the lighting of LEDs $L_1$, $L_2$, ..., and Ln, and the signal current S issued from the output terminal 74. As shown in FIG. 8(b), the LED $L_1$, $L_2$, ..., and $L_n$ is turned on and off one by one in order at the same timing of the clock pulses. The signal current corresponding to the image is issued from the output terminal 74 every lighting of the LEDs.

Referring now to FIG. 9, the composition of the photosensors 36a and 36b will be described. FIG. 9 shows one of the photosensors 36a and 36b upside down. The photosensor 36a (or 36b) is composed of one element of amorphous silicon p-i-n type photodiode.

In FIG. 9, reference numeral 25 denotes the transparent sensor plate composed of glass, synthetic resin, or other preferred material. Reference numeral 80 denotes a transparent electrode which is formed on the sensor plate 25. The electrode may be formed of transparent conductive material such as indium tin oxide (ITO). The electrode 80 of ITO can be made in oxygen atmosphere by means of electron beam evaporation or sputtering evaporation of a mixture of indium oxide and about 5% of tin oxide. When a photosensing portion described later is made of amorphous silicon, the electrode 80 can be made of two layered film comprising tin oxide deposited on the indium tin oxide. The reference numeral 82 denotes the photosensing portion which is made of amorphous silicon film deposited on the electrode 80.

The amorphous silicon film is prepared by glow discharge decomposition of silane ($SiH_4$) doped with diborane ($B_2H_6$) or phosphine ($PH_3$) to produce a p-type layer 82a, an i-type layer 82b, and an n-type layer 82c. The temperature used in this preparation may be as low as 200°-300° C. The p-type layer 82a is formed to the thickness of 50-100 Å by using a mixture of 500-10000 ppm of diborane gas to silane gas. The i-type layer 82b is formed on the p-type layer 82a to the thickness of 0.5-1.5 μm by mixing diborane gas less than 100 ppm to silane gas. The n-type layer 82c is formed on the i-type layer 82b to the thickness of 100-2000 Å by using a mixture of 500-10000 ppm phosphine gas to silane gas. the resulting photosensing portion 82 is etched to have a cross-secton of the shape of trapezoid by using etching gas composed of carbon tetrafluoride ($CF_4$) and 3-15% oxygen in a gas pressure of 0.1-1 torr by means of cylindrical plasma etching equipment. Thus, the side walls 82d of the photosensing portion 82 widen toward the sensor plate 25, and the gradient is 30°-70° degree.

Then, a surface protective layer 84 made of insulative material is formed on the photosensing portion 82 and the electrode 80. Preferably, the surface protective layer 84 is form ed by glow discharging method, because the same glow discharging equipment can be used as in forming the photosensing portion 82, and the resulting layer 84 has the characteristics of good step coverage. Moreover, the photosensing portion 82 has the shape of trapezoid, so that the layer 84 covers the photosensing portion 82 well. The layer 84 can be made of silicon oxide ($SiO_x$) film or silicon nitride ($SiN_x$) film. Then, the layer 84 is selectively etched to make holes 84a and 84b. Metal electrodes 86 and 88 made of aluminum or nicrome are deposited so as to cover the holes 84a and 84b respectively. As a result, the metal electrode 86 is connected to the n-type layer 82c, and the metal electrode 88 is connected to the electrode 80. Thus, the photosensors 36a and 36b are completed. The peripheral region (hereinafter referred to as "rim") 82e of the upper surface of the n-type layer 82c must be disconnected from the electrode 86 by means of the layer 84 for avoiding the contact between the side walls 82d and the electrode 86. However, when the width of the rim 82e becomes wide, the response time of the photosensors 36a and 36b becomes long.

FIG. 10 shows the relation between width of the rim 82e and the response time of the photosensors 36a and 36b. In FIG. 10, the abscissa shows the width of the rim 82e, and the ordinate shows the photo response time. The data of FIG. 10 is based on the photosensing portion which is a circular shape of 3 mm in diameter, using LED of wavelength 660 nm as the light source at lighting time of 10 msec. every 20 msec. period. The photo response time is defined as the time up to 90% of the saturated photosensors' output. And the bias voltage between electrode 86 and 88 is $-3$ V. As shown in FIG. 10, when the width of the rim 82e becomes wide, the photo response time of the photosensors 36a and 36b becomes long. This is supposed to be due to photocarrier pulled to the weak electric field via the portion of n-type layer 82c corresponding to the rim 82e. Although the case in FIG. 10 corresponds to circular shaped photosensors of 3 mm in diameter, this trend is not changed even if the shape and the size are changed. As a result, the width of the rim 82e is preferably less than 50 μm.

In FIG. 9, the light $M_1$ emitted from the LED illuminates the document 26 via the sensor plate 25 and the plate 20, and the reflected light $M_2$ from the document illuminates the photosensing portion 82 via the plate 20, the sensor plate 25, and the electrode 80. As a result, the electron-hole pairs are generated in the photosensing portion 82, that is, the photocurrent is generated in the photosensing portion 82 between the electrodes 86a and 86b. If the direct light $M_3$ emitted from the LED illuminates the photosensing portion 82, the photocurrent caused by the light $M_3$ would results in an erroneous signal. But, the electrode 86 deposited covers the photosensing portion 82 entirely, so that the direct light $M_3$ does not illuminate the photosensing portion 82.

The image reader of the first embodiment as discribed above is of a type in which the reading unit 21 is movable and reads the fixed document.

A second embodiment of the image reader according to the invention is shown in FIG. 11. The image reader of FIG. 11 is of a type in which the reading unit 21 is fixed so as to read the moving document 26.

In FIG. 11, the reading unit 21 comprises the plate 22 having an LED array arranged in a straight line, the rod lens array 24, and the sensor plate 25 having a pair of photosensors in the same way as in the first embodiment, and the reading unit 21 is fixed. The document 26 is moved by a pair of first rollers 90 and a pair of second rollers 92 driven by a motor (not shown) each time one line of the document 26 is read.

As evidenced in the foregoing description, the invention provides the following advantages. According to the invention, the image reader has the low power consumption, because each LED of the LEDs array is turned on and off one by one in order to read the document. And the reading speed of the image reader is fast because of operating in real time mode, not operating in charge storage mode.

Further, in the image reader of the invention, the alingnment of the LED array and a pair of the photosensors is very easy, because a pair of the photosensors are disposed in parallel with respect to each other and the light emitted from each LED passes through approximately the mid position of a pair of the photosensors and the reading output is the amplified output which is superposed with the photocurrents generated respectively in the photosensors and amplified.

Further, the reading circuit of the image reader can be simplified, because it is not necessary to provide switches for the photosensors.

Further, the surface protective layer of the photosensors of the image reader has the good step coverage, because the photosensing portion of the photosensors has a cross section the shape of trapezoid.

Further, the photosensors of the image reader have the good signal-noise ratio, because the photosensing portions of the photosensors are covered with the metal electrode for shading the direct light emitted from the LEDs.

Further, the photosensors of the image reader can improve the photo response time because of making the width less than 50 $\mu$m for the rim which is the peripheral region of the upper surface of the photosensing portion and is covered with the surface protective layer.

Further, the motor for moving the reading unit of the image reader can be of small-sized and light-weighted type, because the reading unit is of a small-sized and light-weighted type.

As a result of the above described advantages, according to the invention, the image reader has properties of small-size, light-weight, and low power consumption, and it is possible to realize the portable facsimile system driven by dry batteries.

From the foregoing, it will now be apparent that a new and improved image reader is realized. It should be understood of course that the embodiments disclosed are merely illustrative and are not intended to limit the scope of the invention. Reference should be made to the appended claims, therefore, rather than the specification as indicating the scope of the invention.

What is claimed is:

1. An image reader for reading a document, comprising:

a reading unit, comprising;

an array of LEDs comprising a plurality of LEDs arranged in a single straight line on a plate so as to form light sources and having a length at least as long as the width of said document, a rod lens array disposed opposite to said array of LEDs for guiding the light emitted from each LED of said plurality of LEDs and for focusing the light on said document, and, a pair of photosensors for converting a reflected light from said document to a photocurrent, said pair of photosensors being disposed opposite to said rod lens array in a parallel arrangement on a transparent sensor plate and being electrically connected in parallel to each other, each of said pair of photosensors having a length which is at least as long as the width of said document, and each of said pair of photosensors being composed of one element comprising a transparent electrode formed on said sensor plate, a photosensing portion formed on said transparent electrode by first depositing and then etching amorphous silicon, a surface protective layer formed on sides of said photosensing portion, and an opaque metal electrode formed on said photosensing portion and said surface protective layer;

an LED driving means for driving each LED of said array of LEDs so as to sequentially turn on only one LED at a time during reading; and, a means for moving at least one of said reading unit and said document relative to the other, wherein the light emitted from each LED illuminates said document via said rod lens array at approximately a mid-position between said pair photosensors and said sensor plate, and wherein said pair of photosensors are responsive to light reflected via said sensor plate from said document so as to generate said photocurrent in response to said reading of said document.

2. An image reader as recited in claim 1, wherein said pair of photosensors are amorphous silicon p-i-n photodiodes.

3. An image reader as recited in claim 1, wherein side walls of said photosensing portion of each of said pair of photosensors widen in a direction toward said document and have a gradient in a range of between 30 and 70 degrees with respect to a surface of said transparent electrode.

4. An image reader as recited in claim 1, wherein said photosensing portion of each of said pair of photosensors has a rim of a width which is less than 50 $\mu$m, said rim being a peripheral region of a surface of said photosensing portion and being spaced apart from said metal electrode.

* * * * *